United States Patent [19]

Martineu et al.

[11] 4,108,937
[45] Aug. 22, 1978

[54] METHOD OF MAKING HOLLOW ARTICLES FROM PLASTIC MATERIAL

[75] Inventors: Pierre Martineu; Jean-Francois Gregoire, both of Chalon-sur-Saone, France

[73] Assignee: Carnaud Total Interplastic, Chalon-sur-Saone, France

[21] Appl. No.: 659,975

[22] Filed: Feb. 20, 1976

[30] Foreign Application Priority Data

Feb. 20, 1975 [FR] France ................................. 75 05251
Aug. 6, 1975 [FR] France ................................. 75 24499

[51] Int. Cl.² .............................................. B29C 17/07
[52] U.S. Cl. ........................................ 264/89; 264/97;
264/98; 264/274
[58] Field of Search .............. 264/89, 94, 96, 97, 264/98, 99, 271, 274, 296, 235, 346; 425/DIG. 214, DIG. 215, DIG. 216, 526, 530

[56] References Cited

U.S. PATENT DOCUMENTS

| 3,125,619 | 3/1964  | Miller ..................................... 264/98 |
| 3,539,670 | 11/1970 | Hall ......................................... 264/99 |
| 3,651,186 | 3/1972  | Hall ......................................... 264/94 |
| 3,694,534 | 9/1972  | Troadec ............................. 264/98 X |
| 3,754,851 | 8/1973  | Reilly et al. ...................... 264/98 X |
| 3,791,098 | 2/1974  | Webster ............................ 264/96 X |
| 3,801,690 | 4/1974  | Gilbert .................................. 264/99 |
| 3,849,530 | 11/1974 | Wyeth et al. ......................... 264/89 |
| 3,966,378 | 6/1976  | Valyi ................................. 264/94 X |

OTHER PUBLICATIONS

K. J. Cleereman et al., "Bottle Blowing Using Multiaxially Oriented Injection Molded Parisons", SPE Journal, 7-1968, vol. 24, pp. 27-31.

*Primary Examiner*—Jan H. Silbaugh
*Attorney, Agent, or Firm*—Brisebois & Kruger

[57] ABSTRACT

Hollow articles are made from a cylindrical preform by first elongating the preform to reduce its diameter and then blowing the elongated preform in a blow mold to produce the completed article, which is thus biaxially oriented.

2 Claims, 7 Drawing Figures

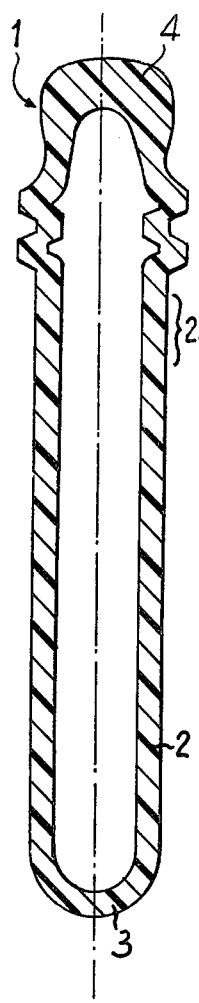
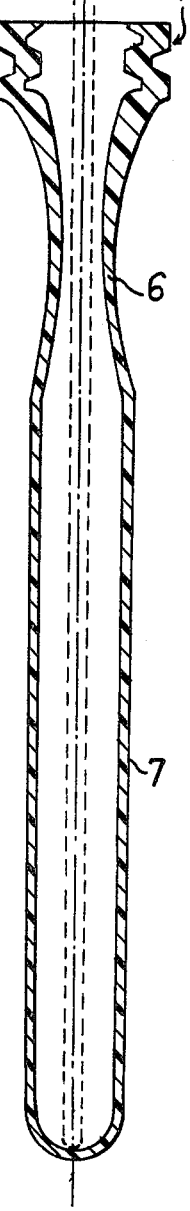
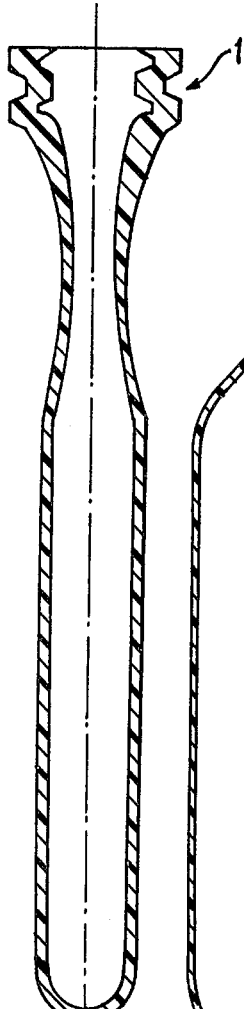
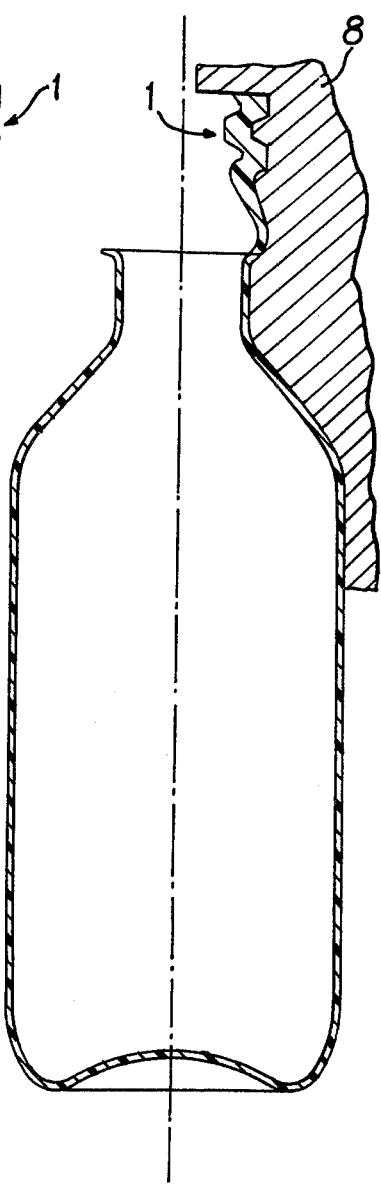

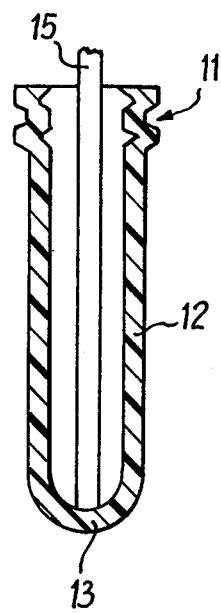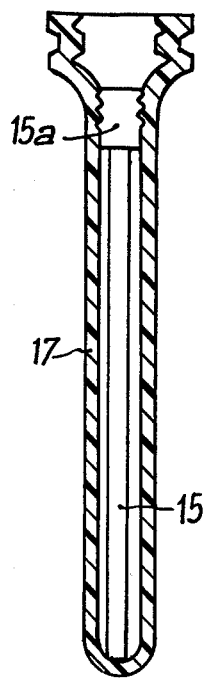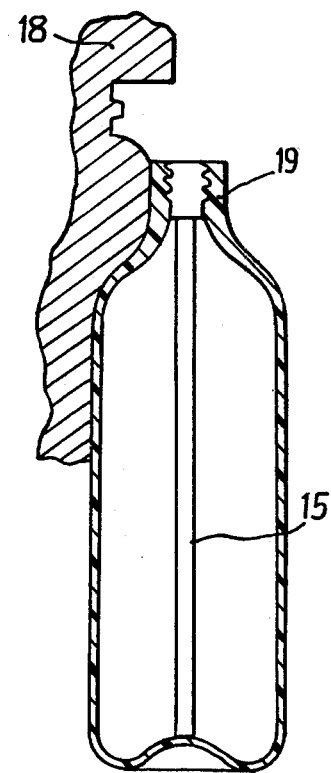

METHOD OF MAKING HOLLOW ARTICLES FROM PLASTIC MATERIAL

SUMMARY OF THE INVENTION

This invention relates to a method of manufacturing hollow articles from a thermoplastic material as well as to the hollow articles produced by this method and to preforms used in carrying out this method.

Various processes for manufacturing hollow articles such as bottles, vials, and cans of thermoplastic material are already known. These consist in manufacturing a preform by any suitable process, for example, extrusion or injection, and then in expanding the preform by blowing it inside a mold, which is generally made in two parts.

It is conventional to expand such preforms at a temperature above their glass transition temperature so as to produce in the material, by biaxial stretching, a state which is defined as being biaxially oriented. Once the preform has been expanded, it is then cooled to preserve the biaxial orientation of the material which was produced during the expansion. The object of this biaxial stretching is to impart to the thermoplastic material particularly valuable properties with respect to strength and mechanical behavior.

In the processes already in use, after the preform supported by the part which is to form the neck or spout, for example, has been introduced into the blow mold, the preform is axially stretched before blowing, in order to elongate it and impart thereto a unidirectional orientation before the final radial expansion.

This axial stretching is usually carried out by means of a slidable finger or member extending into the preform.

These known processes are not, however, entirely satisfactory, especially in that they do not produce by simple blowing hollow bodies having very large transverse dimensions and a neck having a small diameter. In effect, the thickness of the available preform is equal to the thickness of the neck of the hollow body, which constitutes a physical limit on the geometrical possibilities of the hollow body.

Attempts have already been made to solve this problem, for example in U.S. Pat. No. 3,754,851, by producing a preform having a greater thickness below the neck, but this leads to substantial problems in the course of manufacture, either during the extrusion of the preform or during its manufacture by injection, since the control of these thicknesses is particularly difficult and the subsequent deformation of the preform requires a particularly critical control of the differential temperatures.

Moreover, applicant has devised a method for manufacturing hollow bodies in which a biaxial orientation is imparted to the entire hollow body including the neck, which requires a substantial radial deformation of the neck, which would be difficult and perhaps impossible in preforms of the type heretofore known.

The invention proposes to overcome these disadvantages and provide a method of manufacture of hollow bodies utilizing novel preforms which makes it possible to avoid the geometrical and technological limitations already discussed. Moreover, the process according to the invention makes it possible to bring about an increase in the productivity in the manufacture of preforms of hollow bodies; if necessary, an increase in the weight of the hollow bodies manufactured; and, especially when the preform is manufactured by injection or by injection-blowing, an increase in the ratio of the length of the preform to the diameter of the preform, which ratio is normally limited by the problems of the behavior of the core of the injection mold.

The invention also makes it possible to facilitate the manufacture of hollow bodies having a biaxial orientation in all their parts and especially in the neck.

The invention also proposes to facilitate the manufacture of hollow bodies of particular types such as aerosol containers.

It is a further object of the invention to provide a method of manufacturing hollow bodies of thermoplastic material of the crystalline type in which a preform is first prepared, in any suitable manner, from a plastic material, which preform is adapted to be subsequently expanded in order to obtain the final form of the hollow body, and in which the preform is axially elongated before being expanded into its final form, characterized by the fact that the axial stretching is used to produce an important decrease in the diameter of the preform, including the part which is to form the neck, after which the preform is deformed to obtain the final form of the hollow body at a temperature sufficient to obtain a biaxial orientation of the entire hollow body.

Preferably the preform is subjected during this axial stretching to an elongation at least equal to 20% which results in a decrease in diameter at least equal to 20%.

The preform may be made in any manner, for example, by injection, injection-blowing, extrusion, and extrusion-blowing.

In a preferred method of carrying out the invention the elongation and decrease in diameter of the preform may be produced by introducing into the preform an elongated member adapted to cause uni-axial stretching of the preform. However, in a variation, it is possible to produce this uni-axial stretching by pulling on the free end of the preform.

In an especially preferred embodiment of the invention the decrease in the diameter of the preform is produced at a temperature close to but greater than the glass transition temperature, which makes it possible to impart an axial orientation to the preform including the portion thereof which is to form the neck.

In the preferred embodiment of the invention the stretched preform is brought, if it has not already reached it, to a temperature close to but greater than the glass transition temperature, and is then expanded, especially in the radial direction, including the part which is to form the neck of the hollow body. This expansion is such as to produce over the entire hollow body, including its neck, a biaxially oriented state, in which the hollow body solidifies. Preferably the material is elongated at least one and a half times in all directions and in all parts of the hollow body.

The preform may be stretched in accordance with the invention either inside the blow mold or outside it. When stretching is carried out outside the mold it is possible to use a preform having a diameter clearly greater than the smallest internal diameter of the blow mold, the preform being stretched and its diameter reduced so as to permit it to enter the mold. This reduction being preferably sufficient to permit the part forming the neck of the hollow body to also be expanded radially during blowing.

It will be appreciated that, since the invention makes it possible to utilize preforms which may have a greater diameter than that of the neck of the hollow body to be manufactured, the thickness of the preform for a given weight of thermoplastic material used is greatly reduced, which makes it possible to reduce the cooling time necessary to carry out the process according to the invention, and thus substantially increase the productivity in the manufacture of preforms.

The more rapid cooling of the preform also makes it possible to more easily locate the materials in a particularly advantageous amorphous structure.

It is also possible, in certain embodiments, to avoid expansion of the neck during blowing. Thus the invention may be used especially for the manufacture of aerosol containers, the process according to the invention then consisting in elongating and narrowing the preform by using the end of the tube which extends from the aerosol valve. This process is continued until the narrowing is sufficient to imprison the valve within the preform, after which blowing is carried out through the valve by preventing the expansion of the part of the neck directly surrounding the valve.

A particular embodiment of the process of manufacture of the hollow body from a thermoplastic material in which the preform is heated to a temperature greater than, but close to the glass transition temperature of the thermoplastic material, and the preform is actually stretched, is characterized by the fact that the entire preform is biaxially oriented, including the part which is to form the neck of the hollow body, the preform is then solidified in the oriented state and thermostabilized, after which the oriented preform is deformed to obtain the final shape of the hollow body.

Preferably the entire preform is biaxially oriented by radial expansion after axial stretching or simultaneously therewith.

In a preferred embodiment of the invention the preform is axially stretched until it has reached a length at least equal to 2.5 times its initial length.

In an advantageous manner the oriented preform is deformed by expansion so as to impart thereto a diameter at least equal to 2.5 times the diameter of the oriented preform.

In one particular embodiment of the invention, especially useful in the case of crystalline type polymers, it is particularly advantageous to carry out the thermostabilization step on the preform at a temperature greater than the crystallization temperature of the polymer.

It is a further object of the invention to provide as new articles of manufacture hollow bodies produced by the process according to the invention.

Finally, it is also an object of the invention to provide, as novel intermediate products, preforms made of a plastic material adapted to be blown and which are characterized by the fact that they have been stretched so as to produce a substantial decrease in their diameter under the conditions according to the invention.

Other advantages and characteristics of the invention will appear from a reading of the following description, given purely by way of illustration and example, with reference to the accompanying drawings, in which:

FIG. 1 is an axial sectional view through a preform before stretching;

FIG. 2 shows this preform after axial stretching;

FIG. 3 is a sectional view through the final hollow body and a portion of the mold;

FIG. 4 is an axial section taken through a preform which has been injected and blown;

FIG. 5 shows the preform after stretching;

FIG. 6 is a sectional view through the final hollow body obtained, together with part of the mold;

FIG. 7 represents a preform after thermostabilization according to a variation of the invention.

Referring now to FIGS. 1 to 3, the object is to manufacture a hollow body such as a bottle adapted to resist pressure, for example to contain carbonated liquids, which should be transparent and capable of tolerating substantial increases in temperature so that it may be sterilized. For this reason a parison of a thermoplastic polyester is extruded in a conventional manner. This material may be, for example, the polyterepthalate of ethylene glycol. This parison is then treated in a conventional manner in a mold, for example one having two separate parts and a cavity corresponding to the desired preform, the walls of which are energetically cooled. The parison is expanded by the introduction of a fluid under pressure at a regulated temperature, so as to force it to assume perfectly the shape of the mold cavity. The preform is abruptly cooled on contact with the mold, which permits it to acquire an amorphous structure. When the preform is then removed from the mold it has the shape shown on FIG. 1 with an upper part 1, hereinafter called the false ring, a substantially cylindrical body 2, and a bottom 3.

Above the zone called the false ring 1 there is a flattened zone 4 which corresponds to the part of the parison which is squeezed between the two parts of the mold of the preform during closure thereof over the parison and which thus permits the parison to be held inside the preform mold before and during blowing. This zone 4 is then cut off by conventional means, as shown in FIG. 2.

After removal of the part 4, the preform is carefully heated to a temperature between 1° and 30° above the glass transition temperature. Preferably, the upper part of the body, in zone 2a, is heated by radiation, for example, to an average temperature greater than the temperature of the material in the lower zones of the body 2 and the bottom 3.

The preform heated in this manner is then introduced into the final blow-mold, in which it is held by the upper part of the mold, which conforms closely to the shape of the false ring 1.

Without loss of time a slidable rod 5 is introduced into the preform and moved axially to push down the bottom 3, thus stretching or elongating the preform at the same time that its diameter and thickness are decreased. FIG. 2 shows the elongated and stretched preform at the end of this step. It will be especially noted that because of the difference in temperature between the zone 2a and the other zones of the initial preform, the narrowing is greater in the zone 6, which corresponds to the zone 2a, than in the zone 7, corresponding to the lower part of the zone 2. It is this zone 6 which will ultimately become the neck of the hollow body. It is clear that, in order to facilitate understanding of the invention, the narrowing at the level of the zone 6 has been substantially exaggerated on the drawing.

Preferably the elongated preform is at least 1.2 times longer than the starting preform shown on FIG. 1. Once the elongation has been completed and a preform according to FIG. 2 obtained, the material is still above the glass transition temperature. It is useful at this step to control the temperature of the preform and it is desirable to wait to carry out the subsequent blowing until the preform has reached a uniform temperature. A final blowing is then carried out so that the preform expands, this time substantially radially, to produce a configuration such as illustrated on FIG. 3. FIG. 3 shows the final form of the hollow body as well as a partial view of the upper part corresponding to the false ring in part of the mold 8. After removal from the mold this upper part 1 is cut off to produce the final form of the bottle desired.

Preferably the radial expansion is such that, throughout the hollow body, the final diameter is at least 1.2 times greater than the diameter of the corresponding part of the preform of FIG. 2.

The state of biaxial orientation which is obtained in the material at the end of final blowing remains the same.

The blowing may advantageously be followed by a heat treating step, that is to say, an increase in the temperature which makes it possible to release the residual intermediate strains, which is carried out for example between 180° and 200°.

It is particularly valuable to carefully control the temperatures during blowing and especially during the final blowing. To this end it is, for example, possible for the elongated preform of FIG. 2 located in the final blow mold 8 to remain, during a first part of the blowing, at a temperature greater than the glass transition temperature and then reach toward the end of the blowing step a temperature lower than this transition temperature which makes the strains of the biaxially oriented state permanent, with the final heat treating step taking place during contact with the heated walls of the mold. Of course it would be equally possible to utilize a mold having cooled walls and carry out the heat treatment after removal from the mold.

It will be appreciated from the example of FIGS. 1, 2 and 3 that the diameter of the body 2 of the preform in the state shown in FIG. 1 is less than, or at most equal to, the diameter of the final neck 5 of the bottle, which makes it possible to introduce the preform of FIG. 1 into the blow-mold 8 and to proceed to the successive stretching operations utilizing the rod and blowing.

Referring now to FIGS. 4, 5 and 6, in this embodiment a preform illustrated on FIG. 4 and having a false ring 11, a body 12 and a bottom 13, is produced by injection-blowing. It will be seen that the diameter of the body 12 is clearly greater than the final diameter of the neck of the final hollow body 19.

In this case the preform of FIG. 4 is brought to a temperature greater than, but close to, the glass transition temperature and it is elongated outside the final blow mold. The decrease in diameter of the preform is produced by an axially sliding finger 15, while the preform is solidly held by its false ring 11.

The sliding finger 15 may, for example, consist of a tube 15 of an aerosol valve 15a and it will be seen on FIG. 5 that at the end of the descending movement of this tube 15 the head of the valve 15a is imprisoned in the wall 17, due to its decrease in diameter.

At the end of this elongation, during which the preform is always at a temperature close to but greater than the glass transition temperature, or has been brought to such a temperature, the elongated preform is placed in the blow-mold and blown through the tube 15 and a lateral orifice (not shown) provided for this purpose. It will be seen that, in this embodiment, the neck 19 does not undergo any radial expansion.

Of course it is also necessary to decrease the diameter of the preform outside the final blow-mold in the case in which, despite a radial expansion of the neck during the final blowing, the diameter of the preform before axial stretching remains greater than the diameter of the final neck of the hollow body.

In a variation of the invention a sliding rod 5 is introduced into the heated preform without inserting the preform in the blow mold. FIG. 2 shows the elongated and narrowed preform at the end of this step.

Preferably the elongated preform is 2.8 to 3 times longer than the starting preform shown on FIG. 1.

The preform is then radially expanded and heated so as to produce thermostabilization with a view to releasing the residual intermediate strains, which heating takes place at a temperature of about 180° C, that is to say, greater than the crystallization temperature of the polymer used (140° C).

Since the thermostabilization step takes place outside the mold in which the hollow body attains its final form, it is possible to increase the cadence of production.

The preform after the thermostabilization step has the shape shown on FIG. 7.

The preform is then placed in the blow mold for the hollow body and expanded so as to impart thereto a diameter equal to preferably from 3 to 3.3 times the diameter of the oriented preform so as to produce a form such as the one shown in FIG. 3.

The state of biaxial orientation imparted to the material is retained and improved homogenization of the strains and a greater dimensional stability of the hollow body results.

The hollow body obtained has a resistance to axial traction of 10 to 13 kg/mm$^2$ and circumferentially a resistance of 20 to 24 kg/mm$^2$.

While the invention has been described in connection with a particular embodiment, it will be appreciated that it is not limited thereto and may be modified as to details of form and material without thereby departing from the basic principles of the invention.

What is claimed is:

1. A process of manufacturing biaxially oriented hollow bodies from an elongated, generally cylindrical amorphous crystalline thermoplastic polyester parison which includes a neck part from which a neck is to be formed, comprising the steps of:

expanding said parison in a preform mold to form a preform while keeping said preform in an amorphous condition and then axially stretching said preform, including said neck part, at a temperature greater than, but close to, the glass transition temperature, to cause a substantial decrease in the diameter thereof, and expanding the preform, to an extent sufficient to cause biaxial orientation of the preform, solidifying said preform in the biaxially oriented state and then thermostabilizing said preform, and then deforming said preform at a temperature greater than, but close to, the glass transition temperature to produce said biaxially oriented hollow body.

2. A process according to claim 1 wherein said crystalline thermoplastic polyester parison comprises a parison of polyterephthalate of ethylene glycol.

* * * * *